Jan. 14, 1958     W. J. JOHNSON     2,819,564
MACHINE FOR SHARPENING ROTARY CUTTERS
Filed July 11, 1955     5 Sheets-Sheet 1
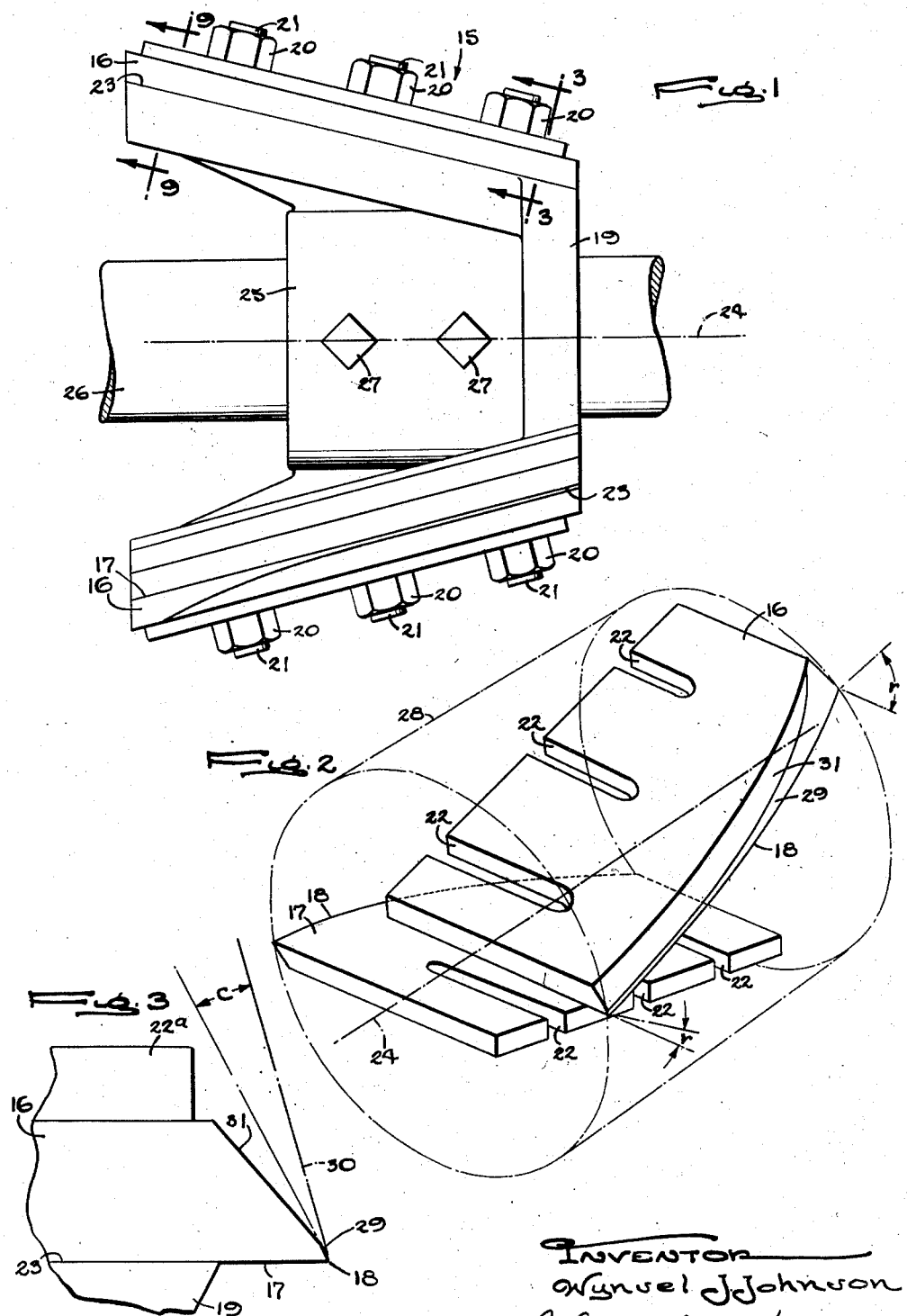

Jan. 14, 1958 W. J. JOHNSON 2,819,564
MACHINE FOR SHARPENING ROTARY CUTTERS
Filed July 11, 1955 5 Sheets-Sheet 2
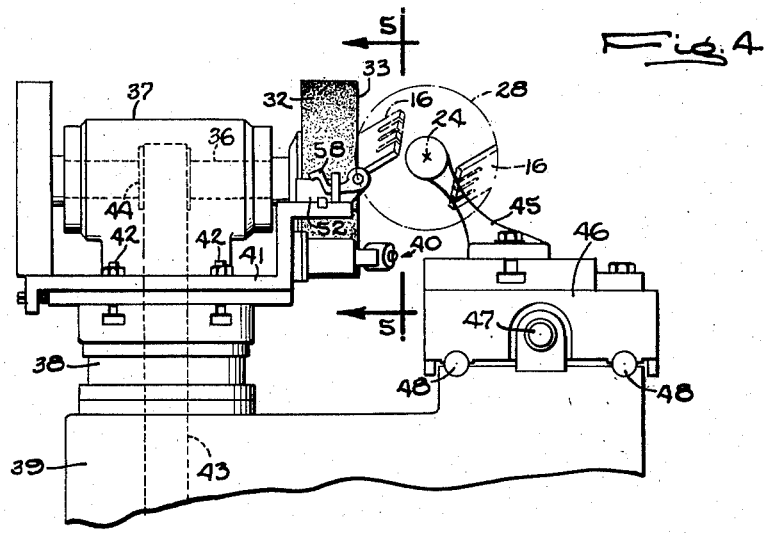
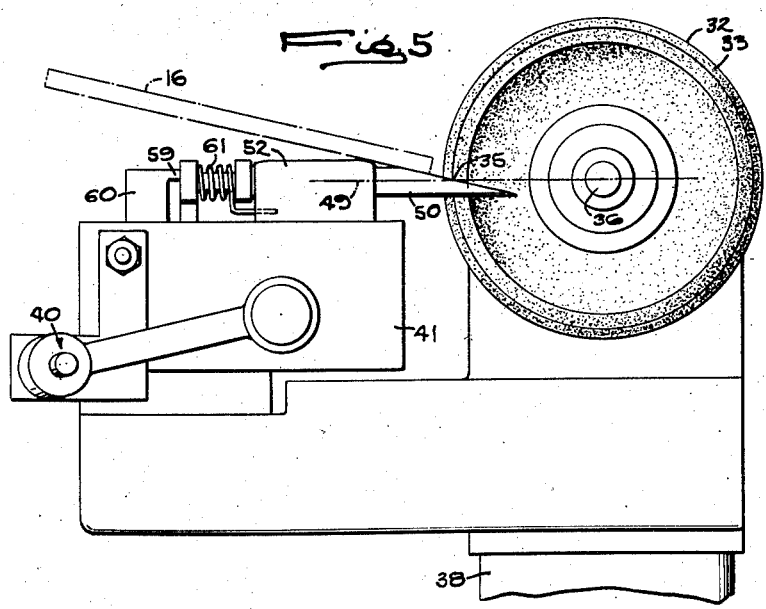
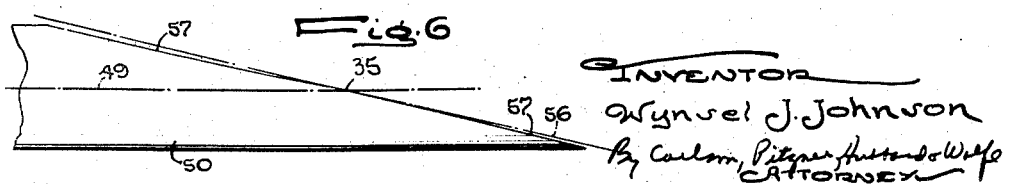

Jan. 14, 1958 W. J. JOHNSON 2,819,564
MACHINE FOR SHARPENING ROTARY CUTTERS
Filed July 11, 1955 5 Sheets-Sheet 3

INVENTOR
Wynvel J. Johnson
By Carlson, Pitzner, Hubbard, Wolfe
ATTORNEY

Jan. 14, 1958 W. J. JOHNSON 2,819,564
MACHINE FOR SHARPENING ROTARY CUTTERS
Filed July 11, 1955 5 Sheets-Sheet 4
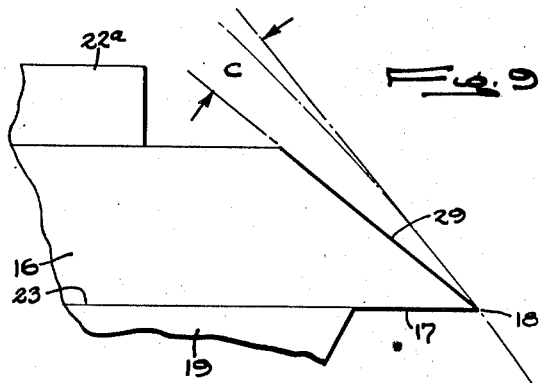
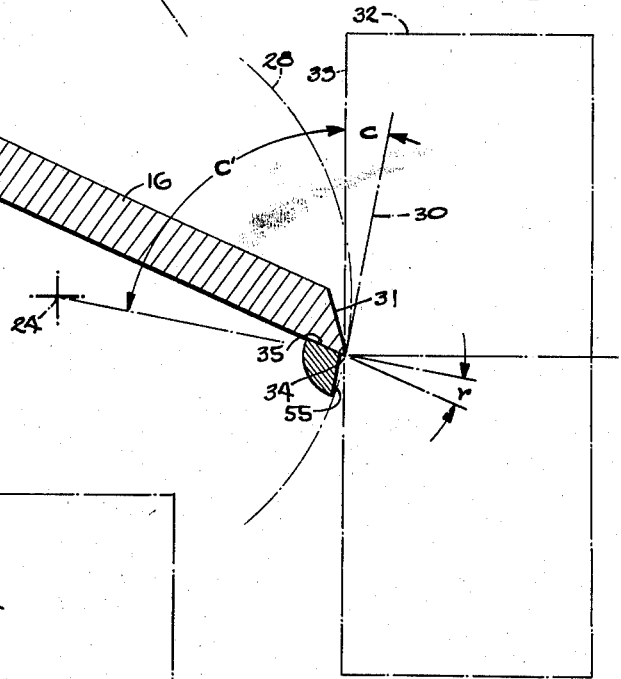
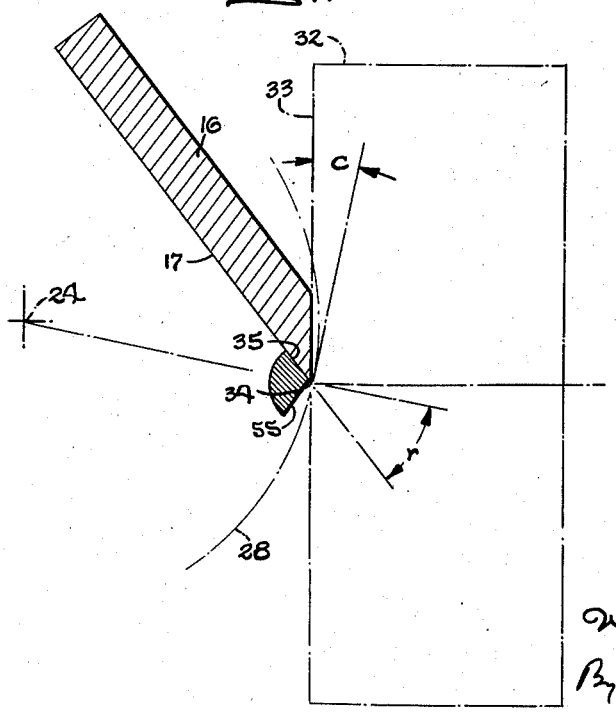

Jan. 14, 1958 W. J. JOHNSON 2,819,564
MACHINE FOR SHARPENING ROTARY CUTTERS
Filed July 11, 1955 5 Sheets-Sheet 5
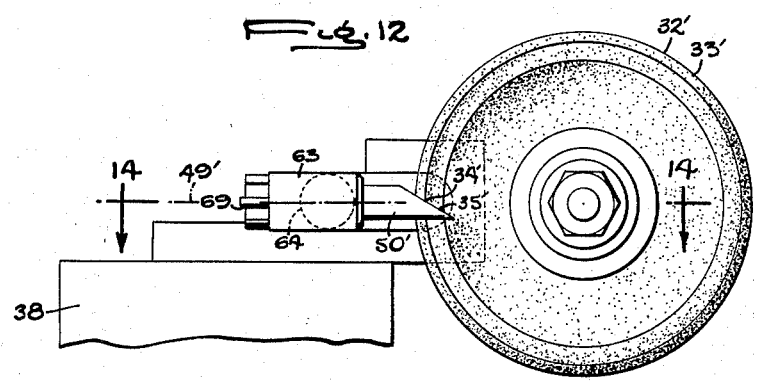
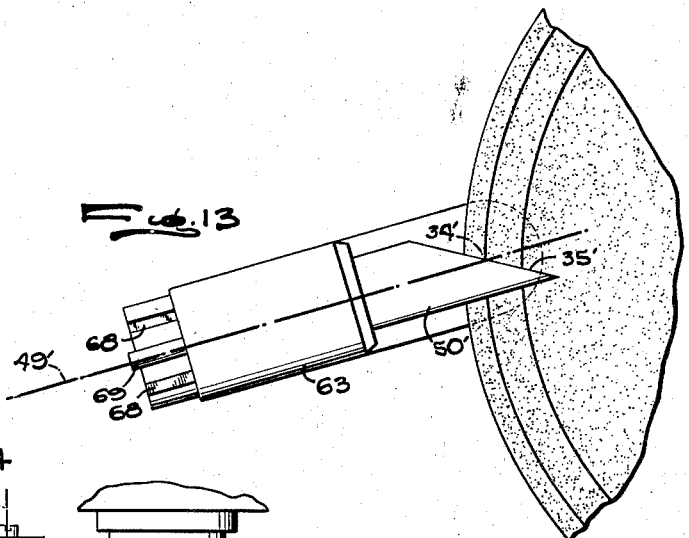
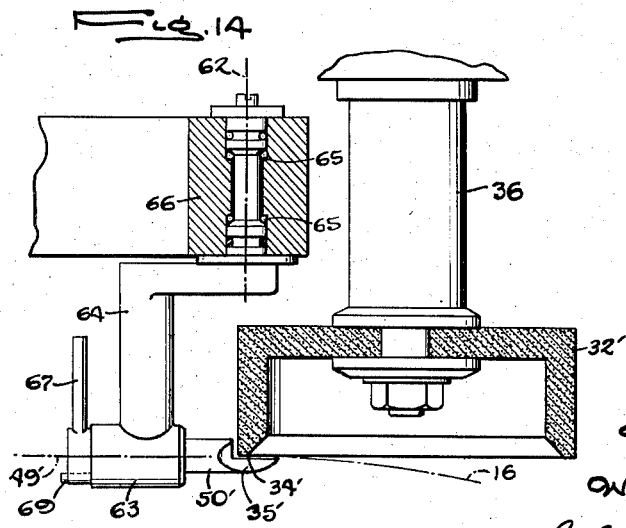

United States Patent Office 2,819,564
Patented Jan. 14, 1958

2,819,564

MACHINE FOR SHARPENING ROTARY CUTTERS

Wynsel J. Johnson, New Milford, Ill., assignor to Greenlee Bros. & Co., Rockford, Ill., a corporation of Illinois Application July 11, 1955, Serial No. 521,136

11 Claims. (Cl. 51—123)

This invention relates to the grinding of the clearance faces on rotary cutters having angularly spaced blades with edges which extend helically and at a desired shear angle around the cutter axis and provide a cylindrical or conical peripheral cutting face. The invention has more particular reference to such cutters in which each blade, in order to simplify its construction, is formed with a flat cutting face.

When such flat faced blades are mounted in the cutter body to approximate a helical blade, the rake angle varies progressively along the length of the blade. This characteristic precludes the use of ordinary cutter grinders in sharpening the blades to provide a true elliptical cutting edge with a correspondingly true peripheral cutting face and a constant clearance angle at all points along the cutting edge as is desirable for many uses. As a result, it has been customary to sharpen the blades of such cutters individually and later assemble the same in the cutter body.

The primary object of the present invention is to provide for sharpening cutters of the above character after assembly of the blades while providing precisely a true peripheral cutting face and the same clearance angle at all points along the cutting edges.

Another object is to control the angular position of the cutter relative to the sharpening wheel by means of a stop engageable with the cutting face of the blade being sharpened and adjustable automatically to compensate for the rake angle changes across such face.

The invention also resides in the novel and simple mounting of the blade engaging stop to effect its adjustment automatically in response to holding the blade against the stop while the blade edge is being moved across the grinding face.

A further object is to adapt the adjustable stop for use in sharpening blades set at different shear angles.

Other objects and advantages of the invention will become apparent from the following detailed description taken in connection with the accompanying drawings, in which Figure 1 is a plan view of a rotary cutter adapted to be sharpened in a machine embodying the novel features of the present invention.

Fig. 2 is a perspective view of the cutter blades as they are mounted in the cutter body.

Fig. 3 is a fragmentary sectional view taken along the line 3—3 of Fig. 1.

Fig. 4 is a fragmentary end elevational view of the improved machine.

Fig. 5 is a sectional view taken along the line 5—5 of Fig. 4.

Fig. 6 is an enlarged view of the stop finger similar to Fig. 5.

Fig. 9 is a fragmentary sectional view taken along the line 9—9 of Fig. 1.

Figs. 10 and 11 are schematic views showing different positions of a cutter blade relative to a grinding wheel.

Fig. 12 is a view similar to Fig. 5 of a modified stop finger.

Fig. 13 is a fragmentary enlarged view similar to Fig. 12 showing the stop finger in a different position.

Fig. 14 is a fragmentary view taken along the line 14—14 of Fig. 12.

Figure 7:
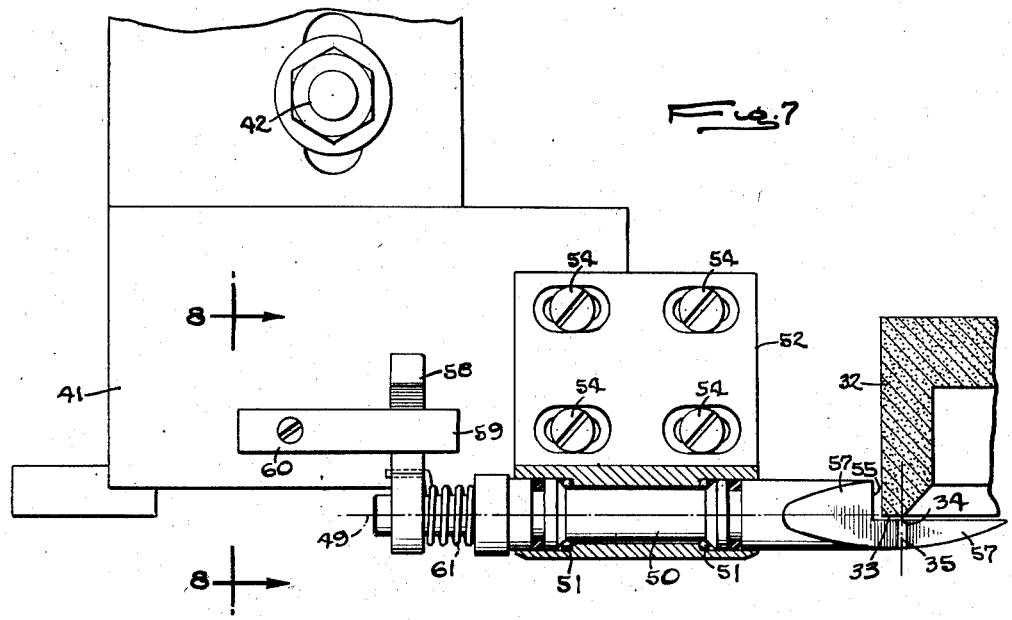
Fig. 7 is a fragmentary plan view of the machine.

The grinding machine shown in the drawings to illustrate the present invention is especially adapted for sharpening a rotary cutter 15 (Fig. 1) of the type having a plurality of angularly spaced blades 16, herein two, formed with flat cutting faces 17 and cutting edges 18 which extend helically around the periphery of the cutter body 19. Nuts 20 threaded on bolts 21 rigid with the body and extending through slots 22 in each blade act through plates 22ᵃ to clamp the blade adjustably to the body with its cutting face 17 lying against a flat backing surface 23. This surface and therefore the cutting face are inclined relative to the cutter axis 24 at the desired shear angle of the blade, in this instance 12 degrees. A hub 25 of the cutter body 19 is bored to receive an arbor 26 which is concentric with the axis 24 and to which the body may be secured by the usual set screws 27.

During rotation of the cutter 15 about its axis 24, the cutting edges 18 of the blades present a peripheral cutting face 28 (Fig. 2) which may lie on a cone or, as in this instance, a cylinder concentric with the cutter axis, the cutting edges themselves being elliptical. Each cutting edge is formed by the intersection of the cutting face 17 and a primary clearance face 29 which is inclined relative to a tangent 30 of the peripheral face 28 through the cutting edge at the desired clearance angle $c$ of the blade (see Figs. 3, 10 and 11). Such tangent coincides with the finished surface of a workpiece operated on by the cutter. Defined another way, the clearance angle $c$ is the complement of the included angle $c'$ between the clearance face and a radius through the cutting edge. Herein, the clearance angle $c$ is equal to 12 degrees. Behind the primary clearance face 29, the blade is relieved back to a secondary clearance face 31 to reduce the amount of material which must be removed to sharpen the cutting edge.

In the above cutter 15, the rake angle of each blade 16, that is the angle $r$ between the cutting face 17 and a radius through the cutting edge 18, varies progressively along the latter from one end to the other as shown in Fig. 2. To sharpen the blade with a uniform clearance angle $c$ at all points along the cutting edge 18 as is desired in some cases, particularly where the cutter is used on wood, it has been the practice heretofore first to remove the blade from the cutter body 19. Then, the blade was mounted in a separate support which, during longitudinal movement of the cutting edge across an abrasive surface, was turned by cam operated mechanism to compensate for variation of the rake angle, the sharpened blade finally being remounted in the cutter body. As an alternative, the blade, separate from the body, was held and turned manually in an effort to maintain the proper angle between the blade and the abrasive surface to attain a true elliptical cutting edge with a constant clearance angle. Such manual grinding necessarily required a highly skilled operator.

The present invention contemplates the provision of a machine for sharpening blades 16 of the above character while the same remain assembled to the cutter body 19 and, at the same time, insuring that the peripheral cutting face 28 of the cutter remains true with the clearance angle $c$ constant throughout the length of the cutting edge 18. To these ends, the cutter 16 is supported for rotation about its axis 24 and a grinding wheel 32 is mounted for movement of an abrasive surface 33 thereon in a path intersecting the desired finished cutting peripheral cutting face 28 at a predetermined grinding point 34 (Figs. 5, 7, and 8) such that the angle $c'$ between the abrasive surface and a radius of the peripheral cutting face through the point is the complement of the desired clearance angle $c$. As the abrasive surface 33 and the cutter body are relatively shifted longitudinally of the cutter axis 24 to prevent all sections of the cutting edge 18 successively to the abrasive surface, the cutting face 17 is held against a stop 35 which is constructed and mounted in a novel manner to compensate for variations of the rake angle $r$ along the blade and maintain the cutting edge in contact with the abrasive surface at precisely the same point 34.

In the improved machine, the grinding wheel 32 is fast on a shaft 36 (Fig. 4) journaled in a housing 37 rigid with a column 38 on the base 39 of the machine. While a circumferentially facing surface on the wheel may be utilized as the abrasive surface 33 with a correspondingly hollow ground clearance face 29 as is well known in the art, it is preferred to use an axially facing surface on the end of the wheel moving in a plane normal to the wheel axis so as to form a flat clearance face. Herein, the wheel is cup-shaped and the abrasive surface 33 is the outer axially facing end at the mouth of the cup. A suitable dressing tool 40 is supported on a slide 41 to swing in the plane of the abrasive surface 33 about an axis parallel to the wheel axis and into and out of engagement with the abrasive surface in a well known manner. The slide 41 is reciprocable longitudinally of the wheel axis on the column 38 and is secured adjustably to the latter by bolts 42. During grinding and dressing operations, the grinding wheel 32 is rotated continuously by a power driven belt 43 (Fig. 4) extending around a pulley 44 fast on the shaft 36.

The cutter body 19 with the blades 16 assembled thereto is secured to the arbor 26 as described above and the arbor is supported in suitable head and tail stocks 45 on a work slide 46 (Fig. 4) for rotation of the cutter about its axis 24. The latter is spaced from the predetermined grinding point 34 a distance equal to the desired finished radius of the peripheral cutting face 28. Relative movement of the abrasive surface and the cutter longitudinally of the cutter axis to present successive sections of the cutting edge 18 to the grinding wheel 32 is effected by turning a screw 47 acting between the work slide and the base 39 to reciprocate the slide along guides 48 extending along the base in a direction normal to a plane of the peripheral cutting face 28 through the grinding point 34. In this instance where the abrasive surface 33 travels in a plane and faces axially away from the grinding wheel 32 and the peripheral cutting face 28 is cylindrical, the guides 48 and the cutter axis 24 extend parallel to each other and to the plane of the abrasive surface. Under these same conditions, the inclination of the plane of the latter to a tangent of the peripheral cutting face through the grinding point 34 determines and is equal to the clearance angle $c$ of the blade 16.

To maintain the cutting edge 18 in contact with the abrasive surface 33 precisely at the grinding point 34 and thereby sharpen the clearance face 29 at the same angle $c'$ (Fig. 10) relative to the radius of the cutter 15 as successive portions of the cutting edge are presented to the abrasive surface, the stop 35 is adapted to engage the cutting face 17 of the blade at a plurality of points lying in a plane including the grinding point and is angularly adjustable to compensate for changes of the rake angle. Such angular adjustment is effected by mounting the stop for swiveling about an axis 49 extending across the abrasive surface 33 and through the grinding point 34. With this mounting, the stop, although contacting the cutting face at points spaced from the grinding point, acts as a surface of infinitesimal width engageable with the cutting face 17 exactly at the grinding point to limit rotation of the cutter.

In the present instance, the stop 35 is formed on one end of an elongated cylindrical finger or shaft 50 (Figs. 4 to 7) extending outwardly and generally radially from the abrasive wheel 32 and journaled intermediate its ends in bearings 51 on a block 52 with the swivel axis 49 paralleling the cutter axis 24. The block 52 is slidable along a guide 53 (Fig. 8) parallel to the swivel axis on the dressing tool slide 41 and is releasably clamped to the slide by bolts 54. Adjacent the stop, the finger 50 is recessed as indicated at 55 (Fig. 7) to receive the grinding wheel and locate the stop close to the grinding point 34. While the stop proper may be a sharp straight edge extending transversely of the swivel axis, it is shown herein as a flat surface of narrow width extending laterally away from the plane of the abrasive surface and toward the cutter axis and lying in a plane 56 including the grinding point 34. This same plane, when the stop and the cutting face are in abutment, is inclined relative to the swivel axis at an angle equal to the shear angle of the cutter blades 16. On each side of the stop surface 35 along the swivel axis, the finger preferably is relieved as indicated at 57 in Figs. 6 and 7 to compensate for inaccuracies of mounting of the parts, such relief being exaggerated in Fig. 6 for purposes of illustration.

Figure 8:
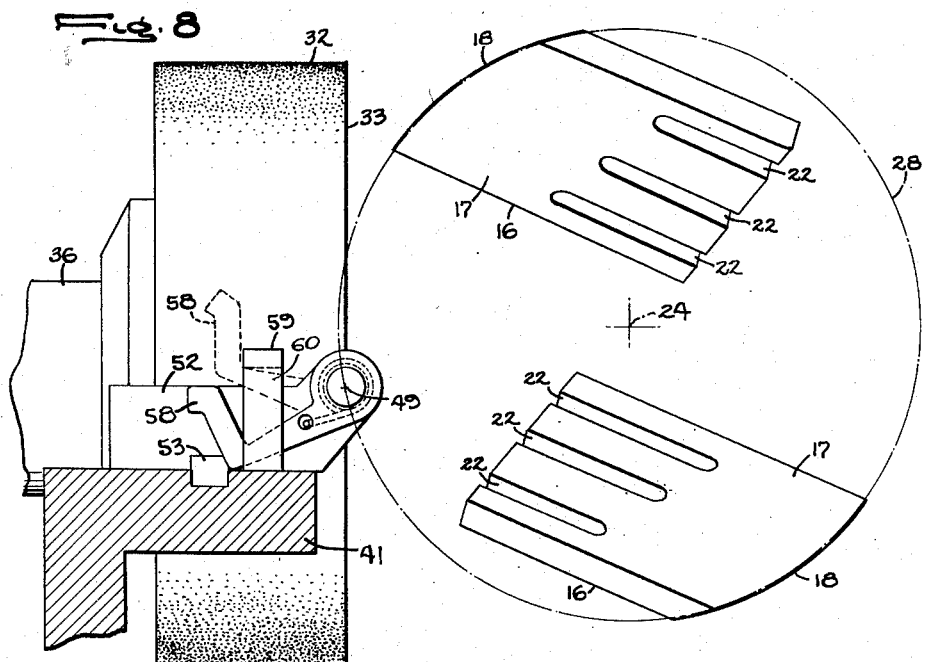
Fig. 8 is a fragmentary sectional view taken along the line 8—8 of Fig. 7.

With the swivel axis 49 extending through the grinding point 34, the stop surface 35 is disposed on only one side of the swivel axis. To enable the stop to follow and lie flat against the cutting face 17 of the blade 15 as the angle between the abrasive surface 33 and the cutting face changes in accordance with the rake angle variations, the finger 50 normally is held in an angular position with the stop facing toward and spaced from the abrasive surface as shown in Fig. 8, but is yieldable angularly under pressure of the cutting face on the stop. An arm 58 projecting rigidly and radially from the finger at the end of the latter remote from the stop engages the slide 41 and a projection 59 on a post 60 secured to the slide to limit turning of the finger in opposite directions between the positions shown in full and in phantom in Fig. 8. While the weight of the arm 58 may be utilized along to urge the finger about the swivel axis in a direction to swing the stop toward the abrasive surface, the arm is assisted in this instance by a coiled spring 61 encircling the finger and acting between the block 52 and the arm 58.

Where blades of successive cutters being ground are disposed at the same shear angle, the swivel axis 49 may be fixed relative to the grinding wheels as shown in Figs. 4 to 8 with the plane 56 of the stop surface 35 disposed at the proper angle relative to the swivel axis to lie in full face to face abutment with the cutting face 17 along all portions of the cutting edge 18. The swivel axis also may be fixed where the stop surface is narrow longitudinally of the swivel axis, the stop then accommodating blades having different shear angles falling within the range of the angles of the relieved portions 57 relative to the swivel axis. Where it is desired to accommodate blades having shear angles falling outside of such range of angles of the guide surfaces 57, the stop finger 50 may be mounted as shown in the modified form of the invention in Figs. 12 to 14 in which parts corresponding to those of the construction of Figs. 4 to 8 bear similar but primed reference characters.

In the modified construction of Figs. 12 to 14, blades having different shear angles are accommodated by mounting the stop finger 50' to swivel about a second axis 62 extending transversely to the first swivel axis 49' and through the grinding point 34'. Also, the flat stop surface 35' is adapted to engage the cutting face 18 at points spaced along the first swivel axis 49' from the second axis 62 far enough to develop sufficient moment about the second axis to maintain the stop surface in full face to face abutment with the cutting face. Herein, the stop surface 35' is flat and is adapted to engage the cutting face on both sides of the second swivel axis 62. Like the finger 50 of Figs. 4 to 8, the modified finger 50' is generally cylindrical.

The modified mounting for the stop finger 50' of Figs. 12 to 14 comprises a journal 63 receiving an intermediate part of the finger for rotation about the first swivel axis 49' and carried by one end of an arm 64 of Z-shape. Opposite end portions of the arm 64 parallel the grinding wheel axis and are offset laterally thereof as shown in Fig. 14 to receive the wheel 32' and dispose the stop surface 35' adjacent the grinding point 34'. At its other end, the arm 64 is journaled in bearings 65 carried by a block 66 on the column 38 behind the grinding wheel for rotation of the arm about the second axis 62 which, herein, is normal to the plane of the abrasive surface through the grinding point 34'. A projection 67 projects radially and horizontally from the end of the finger 50' remote from the stop surface 35' and its weight is utilized to urge the stop angularly about the first swivel axis 49' and toward the abrasive surface 33'. Circumferentially facing surfaces 68 on the projection 67 abut a pin 69 rigid with the journal arm 64 to limit such turning in opposite directions and to a position short of the wheel as in the preferred construction of Figs. 4 to 8. Herein, the stop surface 35' is disposed at an angle of approximately 28 degrees relative to the first swivel axis 49' to accommodate shear angles falling within the range of zero to 28 degrees, the stop surface being inclined to accommodate a shear angle of the maximum of 28 degrees in Fig. 12 and an angle of 14 degrees in Fig. 13.

Preparatory to a grinding operation in the improved machine, each blade 16 of the cutter 15 to be sharpened is set out to project the portion of the cutting edge 18 to be removed outwardly beyond the desired peripheral cutting face 28. This is effected simply by loosening the nuts 20 on the cutter body, shifting the blade radially and outwardly along the slots 22 in the blade, and tightening the nuts. The arbor 26 with the cutter body secured thereto then is mounted in the stocks 45 of the tool slide 46 for rotation of the cutter about its axis 24. With the slide 41 secured to the column 38 so as to locate the plane of the swivel axis 49 and the dressing tool 40 for intersection with the peripheral cutting face 28 at the proper point 34 to form the desired clearance angle, the grinding wheel 32 is dressed. For this purpose, the axial position of the wheel shaft 36 and the wheel relative to the housing 37 is adjusted in a well known manner to project the portion of the wheel to be removed beyond the plane of the swivel axis 49 and the dressing tool 40. Then, while the wheel is rotating, the dressing tool is swung against the wheel.

When the abrasive surface 33 and the swivel axis 49 are disposed in the desired relation to the peripheral cutting face 28 as described above, the screw 47 is turned to advance the tool slide 46 and thereby the cutter 15 axially to position one end of the cutting edge 18 being ground opposite the grinding point 34. The grinding operation is then begun by rotating the grinding wheel 32 and by manually turning the arbor 26 and thereby the cutter in a counterclockwise direction as viewed in Fig. 8 to swing the cutting face 17 against the stop 35. Prior to such contact with the cutting face, the stop 35 is positioned as shown in Fig. 8 adjacent but short of the abrasive surface 33 as determined by abutment of the arm 58 with the slide 41. As the cutting face 17 contacts the stop, the finger 50 is turned in a clockwise direction as viewed in Fig. 8 or counterclockwise as viewed in Fig. 10 until the face and the stop are in full face to face abutment. With such abutment, the cutting edge engages the abrasive surface precisely at the grinding point 34.

With a slight angular pressure is maintained manually on the arbor 26 or the cutter 15 to keep the cutting face 17 against the stop 35, the cutter is reciprocated axially with the slide 46 by turning the screw 47 to present successive portions of the cutting edge to the abrasive surface 33. During such movement, the stop finger 35 rotates from the position shown in Fig. 10 to that of Fig. 11 in accordance with changes in the rake angle r at different points along the blade, these figures representing the extreme conditions at opposite ends of the cutting edge 18. The stop is held flat against and follows the cutting face due to the weight of the arm 58 and to the spring 61. The relieved guide surfaces 57 extending beyond the stop provide continued support for the blade when the cutting edge during its reciprocation along the cutter axis moves beyond the grinding point in either direction. When the cutting edges 18 of both blades 16 have been sharpened to the diameter of the peripheral cutting face 28, the cutter is removed from the arbor 26 and is ready for immediate service use.

The operation of the modified finger 50' of Figs. 12 to 14 is the same as that of the preferred finger described above for any one cutter having a constant shear angle after the finger automatically adjusts itself about the second swivel axis 62 for full face to face abutment of the cutting face 16 and the flat stop surface 35'. With the latter extending along the first swivel axis 49' on both sides of the second axis 62, the cutting face of the blade, upon contacting the stop surface, will swing the finger 50' and its supporting arm 64 about the second axis in the proper direction for full face to face contact with the stop surface.

I claim as my invention:

1. A grinding machine for sharpening the clearance face on an elongated blade carried by a rotary body and formed with a flat cutting face terminating in an elliptical cutting edge and having a rake angle which varies progressively along the cutting edge, said machine having, in combination, a grinding wheel having an annular abrasive surface on one side of the wheel concentric with the wheel axis, means rotatably mounting said body for intersection of the sharpened blade edge with said abrasive surface at a predetermined point to form a clearance face at a desired angle relative to a radius of the body through such point, means supporting said wheel and said mounting means for relative movement of the blade and the wheel along the axis of said body to present the full length of said blade edge to said abrasive surface, a support disposed on the opposite side of said wheel and defining a first swivel axis extending longitudinally of said wheel axis and through said point, an arm journaled at one end in said support to turn about said swivel axis and having its other end offset away from said wheel to extend around the latter, an elongated member journaled in the other end of said arm to turn about a second swivel axis extending longitudinally of said body axis and through said point, and a flat stop surface on said member lying in a plane which includes said predetermined point and underlying and in face to face contact with said cutting face.

2. A grinding machine for sharpening the clearance face on an elongated blade carried by a rotary body and formed with a flat cutting face terminating in an elliptical cutting edge and having a rake angle which varies progressively along the cutting edge, said machine having, in combination, an abrasive surface movable in a predetermined path, means rotatably mounting said body for intersection of the sharpened blade edge with said abrasive surface at a predetermined point in said path to form a clearance face at a desired angle relative to a radius of the body through such point, means supporting said abrasive surface and said mounting means for relative movement along the axis of said body to present the full length of said blade edge to said abrasive surface, a support disposed adjacent said predetermined point and defining a first swivel axis extending longitudinally of said body axis and through the point, a member journaled in said support to turn about said first swivel axis and having a flat stop surface lying in a plane which includes said predetermined point and underlying and in face to face contact with said cutting face, and means mounting said support for turning about a second swivel axis extending transversely of and intersecting said first swivel axis at said predetermined point, said stop surface turning about said first axis to accommodate different rake angles of said cutting face and said second axis to accommodate blades having different shear angles.

3. A grinding machine for sharpening the clearance face on an elongated blade extending elliptically around a rotary body and having a flat cutting face with a rake angle which varies progressively along the cutting edge of the blade, said machine having, in combination, a grinding wheel having a flat abrasive surface concentric with the wheel axis, a support rotatably mounting said body for intersection of one point along the blade edge with said abrasive surface to form a clearance face at a desired angle relative to a radius of the body through such point, means supporting said wheel and said support for relative movement along the axis of said body to present the full length of said blade edge to said abrasive surface, a member mounted adjacent said wheel to turn about an axis extending through the point of engagement between said wheel and the sharpened edge of said blade, and a flat surface on said member underlying said blade in face to face abutment therewith and lying in a plane including said point.

4. A machine for sharpening a cutter having a body rotatable about a central axis and a blade projecting from the periphery of the body and having a flat cutter face terminating in an elliptical cutting edge, said machine having, in combination, means rotatably mounting said body to turn about said axis thereof, a grinding wheel, means supporting said wheel for movement of an abrasive face thereon in a plane which extends longitudinally of said body axis and intersects the sharpened cutting edge of said blade at a predetermined grinding point and at an angle such as to form on the engaged part of the blade a flat clearance face inclined at a desired included angle relative to a radius of the body through the point, a support disposed adjacent said grinding point and defining a swivel axis extending across said abrasive face and through the point, a stop journaled in said support to turn about said swivel axis and extending between said body and said point so as to engage said cutting face and thereby limit turning of said blade with said body, said stop having spaced points of engagement with said cutting face lying in a plane including said grinding point, and means mounting said wheel and said body for relative bodily movement along said body axis and said stop to present the full length of the blade edge to said abrasive face while the successive areas of said cutting face are held against said stop points whereby to maintain said included angle constant at all points along the edge.

5. A grinding machine for sharpening the clearance face on an elongated blade carried by a rotary body and formed with a flat cutting face terminating in an elliptical cutting edge and having a rake angle which varies progressively along the cutting edge, said machine having, in combination, a grinding wheel having an annular abrasive surface concentric with the wheel axis, a support rotatably mounting said body for intersection of the sharpened blade edge with said wheel surface at a predetermined point to form a clearance face at a desired angle relative to a radius of the body through such point, means supporting said wheel and said support for relative movement along the axis of said body to present the full length of said blade edge to said wheel surface, a member mounted adjacent said wheel to turn about a swivel axis extending through said point of intersection between said wheel and the sharpened edge of said blade, and a stop on said member defined by points lying in a plane including said intersection point and intersecting said body axis at an angle corresponding to the shear angle of said blade whereby, during relative movement of said body and said wheel along the body axis and while said cutting face is held in face to face abutment with said stop surface, said member turns about said swivel axis to maintain said cutting edge in contact with said wheel precisely at said predetermined point.

6. A grinding machine for sharpening an elongated blade carried by a rotary body and having an elliptical peripheral cutting edge and a flat cutting face with a rake angle which varies progressively along the cutting edge, said machine having, in combination, a grinding wheel having an annular abrasive surface concentric with the wheel axis, means rotatably mounting said body for intersection of the sharpened blade edge with said abrasive surface at a predetermined point to form a clearance face at a desired angle relative to a radius of the body through such point, means supporting said wheel and said mounting means for relative movement along the axis of said body to present the full length of said blade edge to said wheel surface, a support disposed adjacent said wheel and defining a swivel axis extending longitudinally of said body axis and through said predetermined point, an elongated finger journaled at one end in said support to turn about said swivel axis, means on the other end of said finger defining a recess adjacent said abrasive surface to receive the latter and a circumferentially facing stop disposed between the surface and said body axis and lying in a plane including said predetermined point, yieldable means acting between said finger and said support to turn the finger about said swivel axis and swing said stop toward said abrasive surface, and stop means acting between said finger and said support to limit movement of said stop under the action of said yieldable means to a position short of said abrasive surface.

7. A grinding machine for sharpening an elongated blade carried by a rotary body and formed with an elliptical peripheral cutting edge and a flat cutting face with a rake angle which varies progressively along the cutting edge, said machine having, in combination, a grinding wheel having an annular abrasive surface concentric with the wheel axis, means mounting said body for rotation about the axis thereof and for intersection of the sharpened blade edge with said abrasive surface at a predetermined point to form a clearance face at a desired angle relative to a radius of the body through such point, means supporting said wheel and said mounting means for relative movement along said body axis to present the full length of said blade edge to said abrasive surface, a support disposed adjacent said wheel and defining a swivel axis extending longitudinally of said body axis and through said predetermined point, an elongated finger journaled at one end in said support to turn about said swivel axis, means on the other end of said finger defining a recess adjacent said abrasive surface to receive said wheel and a circumferentially facing stop disposed between the surface and said body axis and lying in a plane including said predetermined point, and means acting between said finger and said support and yieldably holding said stop in a position opposing and spaced from said abrasive surface while permitting turning of the stop away from the surface to lie against the cutting face of said blade.

8. A grinding machine for sharpening the clearance face on an elongated blade carried by a rotary body and formed with a flat cutting face terminating in an elliptical cutting edge and having a rake angle which varies progressively along the cutting edge, said machine having, in combination, a grinding wheel having an annular abrasive surface concentric with the wheel axis, a support rotatably mounting said body for intersection of the sharpened blade edge with said wheel surface at a predetermined point to form a clearance face at a desired angle relative to a radius of the body through such point, means supporting said wheel and said support for relative movement along the axis of said body to present the full length of said blade edge to said wheel surface, a second support disposed adjacent said wheel and defining a swivel axis extending transversely of said surface and through said point of intersection between the latter and the sharpened edge of said blade, and an elongated member journaled at one end in said support to turn about said swivel axis and having a stop surface on its other end and a recess receiving said wheel to dispose the stop surface closely adjacent said intersection point, said stop surface lying against said cutting face and in a plane including said point.

9. A grinding machine for sharpening the clearance face on an elongated blade carried by a rotary body and formed with a flat cutting face terminating in an elliptical cutting edge and having a rake angle which varies progressively along the cutting edge, said machine having, in combination, a grinding wheel having an annular abrasive surface concentric with the wheel axis, a support rotatably mounting said body for intersection of the sharpened blade edge with said wheel surface at a predetermined point to form a clearance face at a desired angle relative to a radius of the body through such point, means supporting said wheel and said support for relative movement along the axis of said body to present the full length of said blade edge to said wheel surface, a member mounted adjacent said wheel to turn about an axis extending through said point of intersection between said wheel and the sharpened edge of said blade, and a stop surface on said member underlying and in face to face abutment with said cutting face of said blade and lying in a plane including said intersection point.

10. A grinding machine for sharpening the clearance face on an elongated blade carried by a rotary body and formed with a flat cutting face terminating in an elliptical cutting edge and having a rake angle which varies progressively along the cutting edge, said machine having, in combination, a grinding wheel having an annular abrasive surface concentric with the wheel axis, a support rotatably mounting said body for intersection of the sharpened blade edge with said wheel surface at a predetermined point to form a clearance face at a desired angle relative to a radius of the body through such point, means supporting said wheel and said support for relative movement along the axis of said body to present the full length of said blade edge to said wheel surface, and a member mounted adjacent said wheel to turn about an axis through said point of intersection between said wheel and the sharpened edge of said blade and providing a stop contacting said cutting face at a plurality of points lying in a plane including said intersection point.

11. A grinding machine for sharpening the clearance face on an elongated blade carried by a rotary body and formed with a flat cutting face terminating in an elliptical cutting edge and having a rake angle which varies progressively along the cutting edge, said machine having, in combination, an abrasive element having an active surface movable in a predetermined path, a support rotatably mounting said body for intersection of the sharpened blade edge with said abrasive surface at a predetermined point to form a clearance face at a desired angle relative to a radius of the body through such point, means supporting said element and said support for relative movement along the axis of said body to present the full length of said blade edge to said abrasive surface, a member mounted adjacent said wheel to turn about an axis through said point of intersection between said surface and the sharpened edge of said blade and providing a stop contacting said cutting face at a plurality of points lying in a plane including said intersection point.

References Cited in the file of this patent

UNITED STATES PATENTS

| | | |
|---|---|---|
| 1,694,074 | Martone | Dec. 4, 1928 |
| 1,834,972 | Satterstrom | Dec. 8, 1931 |
| 1,875,547 | Anderson | Sept. 6, 1932 |
| 2,097,664 | Hoeh | Nov. 2, 1937 |
| 2,484,590 | Rocheleau | Oct. 11, 1949 |